United States Patent [19]

Erickson

[11] 4,340,578
[45] Jul. 20, 1982

[54] OXYGEN PRODUCTION BY MOLTEN ALKALI METAL SALTS

[76] Inventor: Donald C. Erickson, 1704 S. Harbor La., Annapolis, Md. 21401

[21] Appl. No.: 198,139

[22] PCT Filed: Nov. 16, 1978

[86] PCT No.: PCT/US78/00149
§ 371 Date: Jul. 15, 1980
§ 102(e) Date: Jul. 15, 1980

[87] PCT Pub. No.: WO80/01066
PCT Pub. Date: May 29, 1980

Related U.S. Application Data

[63] Continuation-in-part of Ser. No. 799,945, May 24, 1977, Pat. No. 4,132,766.

[51] Int. Cl.³ .............................................. C01B 13/02
[52] U.S. Cl. ................................ 423/579; 423/210.5; 423/219
[58] Field of Search ..................... 423/579, 210.5, 219, 423/385, 395, DIG. 12

[56] References Cited

U.S. PATENT DOCUMENTS

| | | | |
|---|---|---|---|
| 588,615 | 8/1897 | Stuart | 423/579 |
| 2,418,402 | 4/1947 | Gorin | 423/579 |
| 3,310,381 | 3/1967 | Guerrieri | 423/579 |
| 3,766,718 | 10/1973 | Campbell | 55/228 |
| 3,856,928 | 12/1974 | Tarman et al. | 423/579 |

OTHER PUBLICATIONS

Freeman, "J. Physical Chemistry", vol. 60, 156, pp. 1487-1493.
Bartholomew, "J. Physical Chemistry", vol. 70, 1966, pp. 3442-3446.
Kirk-Othmer, Encyclopedia of Chemical Technology, vol. 10, 1966, pp. 854-855.

*Primary Examiner*—Edward J. Meros
*Attorney, Agent, or Firm*—Schwartz, Jeffery, Schwaab, Mack, Blumenthal & Koch

[57] ABSTRACT

A continuous process for separating oxygen from air by means of a reversible chemical reaction wherein air is reacted with an oxygen acceptor which is subsequently decomposed to yield the product oxygen, and then recycled. The only energy input required is a conventional combustible fuel, and one object of the process is to reduce the amount of fuel energy required for oxygen production.

The oxygen acceptor is a molten solution of alkali metal salt comprised predominantly of sodium nitrate and potassium nitrate. An efficient process is achieved with this salt by conducting oxygen absorption in multiple countercurrent stages. The compression energy requirement is minimized by combining isothermal and adiabatic compression, and the recovery of compression energy is maximized by processing the exhaust in the sequence combustion, partial expansion, heat exchange, and completion of expansion. Salt-to-salt heat exchange between reaction regions minimizes the pumping requirements.

7 Claims, 3 Drawing Figures

OXYGEN PRODUCTION BY MOLTEN ALKALI METAL SALTS

Research leading to the invention disclosed herein was funded in part by a grant from the U.S. Government.

This application is a continuation-in-part of application Ser. No. 799,945 filed on May 24, 1977, U.S. Pat. No. 4,132,766.

DESCRIPTION

Technical Field

This invention relates to processes wherein oxygen is produced by a decomposition type chemical reaction, and then the oxygen deficient composition, termed an "oxygen acceptor", is regenerated for recycle by reaction with air or other oxygen containing gas mixture.

Background Art

The prior art of this field of invention includes U.S. Pat. Nos. 3,856,928, 3,579,292, 2,418,402, and 3,121,611. Numerous oxygen acceptors have been identified, including BaO, $Na_2MnO_3$, $CuCl_2$, SrO, and Hg. The attribute of chemical air separation processes as a class is that the high pressure air which undergoes reaction and thereby loses part of its oxygen is still at high pressure after the reaction. Therefore it can be expanded through a turboexpander, recovering most or all of its compression energy. In contrast, in cyrogenic processes the air must be cooled and then depressurized to develop the desired cooling effect, thereby expending the compression energy. The most efficient liquefaction processes consume electrical energy at the relatively high rate of 0.29 kwhr (1 MJ) per kg $O_2$ produced, which is equivalent to a thermal input of 22.8 kcal/mole $O_2$ or 1300 BTU/lb $O_2$, given 33% conversion efficiency. Nevertheless, the liquefaction process has been superior to prior art chemical separation processes for various reasons. Most prior art processes have involved either an acceptor or an oxidized acceptor or both which are present in the solid state. This has made circulation of the acceptor composition difficult, and therefore most processes have been batch mode. Most batch mode processes have involved large pressure differences between the oxidation and decomposition parts of the cycle, and therefore have suffered from excessive vent and purge losses. Some processes have attempted to minimize this pressure difference by conducting the decomposition reaction at a higher temperature than the oxidation reaction. This imposes a large heat requirement: not only does the sensible heat of the acceptor have to be furnished, but the full endothermic heat requirement of the decomposition reaction must also be supplied. Those two heat requirements substantially exceed the 22.8 kcal/ mole needed for liquefaction. Another problem encountered in prior art processes is that the equilibrium $pO_2$ of the acceptor composition withdrawn from the absorber has always necessarily been less than or equal to the $pO_2$ of the exhaust gas withdrawn from the absorber. This is because oxygen can only be transferred from a gas to an acceptor if the $pO_2$ of the gas is higher than that of the acceptor. Therefore the larger the fraction of oxygen extracted from the supply air, the lower the exhaust $pO_2$ becomes, and hence the lower the equilibrium $pO_2$ of the oxidized acceptor, making decomposition more difficult and inefficient. Other problems with the prior art processes are that some of them produce unacceptable amounts of impurities in the product gas, e.g. chlorine or mercury, and some experience an unacceptable loss rate of the acceptor, due to chemical breakdown, chemical inactivation, or other possible causes.

The background art which describes the chemical behavior of molten alkali metal nitrate and nitrite salts consists of numerous articles from technical journals, including the following: Bartholomew, R. F., *The Journal of Physical Chemistry*, 70, 1966, pages 3442-3446; and Freeman, E. S., *The Journal of Physical Chemistry*, 60, 1956, pages 1487-1493, published in Easton, Pennsylvania by the Mack Printing Co. Several characteristics of the reaction between those salts and oxygen have been noted. High levels of nitrogen oxides have been invariably noted, as high as several percent, which is several orders of magnitude above environmental limits. The reaction kinetics have been quantified, showing a relatively high activation energy. At higher temperatures the salt decomposes to the solid oxide.

DISCLOSURE OF INVENTION

The invention claimed is an oxygen acceptor composition which is liquid and remains liquid when reacted with air at process conditions, and which does not introduce undesirable impurities in the product oxygen. The invention also includes the disclosure of a process which takes advantage of the unique characteristics of the new oxygen acceptor, thereby substantially reducing the amount of energy necessary to produce oxygen.

The oxygen acceptor is a molten mixture of alkali metal salts. The salt anion composition includes 50 to 94% nitrate, 4 to 25% nitrite, and 2 to 25% combined peroxides and superoxides, where % signifies molar percent. The cation composition includes sodium and potassium in any proportions, preferably between 30% and 70% sodium, balance potassium.

Important features of the process are as follows. First, the reaction between the salt and air is conducted in multiple countercurrent stages, thereby enabling the salt $pO_2$ to approach that of the incoming air, and greatly exceed that of the exhaust air. The net result of the countercurrent multistaged absorption is that for a given decomposition pressure and level of oxygen extraction, it is possible to greatly reduce the absorption pressure, thereby markedly improving overall process efficiency. Secondly the exhaust air is processed as follows: combusted with fuel; partially expanded; heat exchanged against incoming air, and then fully expanded. This sequence recovers maximum mechanical energy from the exhaust while still supplying air preheat requirements, owing to the heat being applied to the process at the hottest possible temperature. Thirdly, it is advantageous to have the absorption reaction and decomposition reaction in heat exchange relationship. This has the effect of substantially reducing salt pumping requirements and also minimizing the temperature difference between the two reactions. Finally, the total amount of compression energy required for given process conditions can be minimized by using an isothermal compressor (i.e. one with stage cooling) followed by an adiabatic compressor, where each compressor furnishes at least one fourth of the total compression power.

By using the above identified salt composition as the oxygen acceptor in a process incorporating the above features, with the approximate operating conditions subsequently to be disclosed, it is possible to generate oxygen with a thermal energy input of 1.8 MJ/kg O$_2$, which is only 60% of the liquefaction plant thermal energy requirement.

BEST MODE FOR CARRYING OUT THE INVENTION

The best mode for carrying out this invention requires that a very specific salt composition be used as the oxygen acceptor. That composition has been found to be widely useful for producing oxygen in a variety of processes. The best process for producing oxygen using the above composition will vary with input conditions and process objectives, for example whether or not air is already available at high pressure, whether high temperature waste heat is available, and whether it is desired to cogenerate mechanical or electrical power or nitrogen in addition to oxygen.

For the simple case of a stand-alone process in which it is desired to produce only oxygen starting with ambient air and using a standard fuel as essentially the only energy input, a process will be disclosed which takes full advantage of the above composition, producing oxygen very efficiently. Thus the best mode discussion will disclose the essential aspects of the salt composition, the processing steps and apparatus for one process objective, and the best operating conditions for that same process.

Salt Composition

The following reaction stoichiometrics are present in the salt, where M signifies an alkali metal cation, i.e. either sodium or potassium:

(1) $MNO_2(l) + \frac{1}{2}O_2(G) = MNO_3(l)$
(2) $M_2O_2(l) + O_2(g) = 2MO_2(l)$
(3) $MnO_2(l) + MO_2(l) = MNO_3(l) + \frac{1}{2}M_2O_2(l)$
(4) $M_2O_2(l) + CO_2(g) = M_2CO_3(l) + \frac{1}{2}O_2(g)$
(5) $M_2O_2(l) + H_2O(g) = 2 MOH(l) + \frac{1}{2}O_2(g)$
(6) $2MNO_2(l) = M_2O_2 + N_2(g) + O_2(g)$
(7) $N_2(g) + 1.5O_2(g) = NO(g) + NO_2(g)$ The first reaction is most descriptive of the major exchange of oxygen between the salt phase. As oxygen reacts with the salt, the nitrate concentration increases and the nitrite concentration decreases. These species approximate ideal solution behavior, i.e. their activity is essentially equal to their mole fraction. The equilibrium constant expression for reaction (1) is:

$$K_p = \frac{a(MNO_3)}{a(MNO_2)} (pO_2)^{-\frac{1}{2}} = e^{-\frac{\Delta G}{RT}}$$

Figure 3:
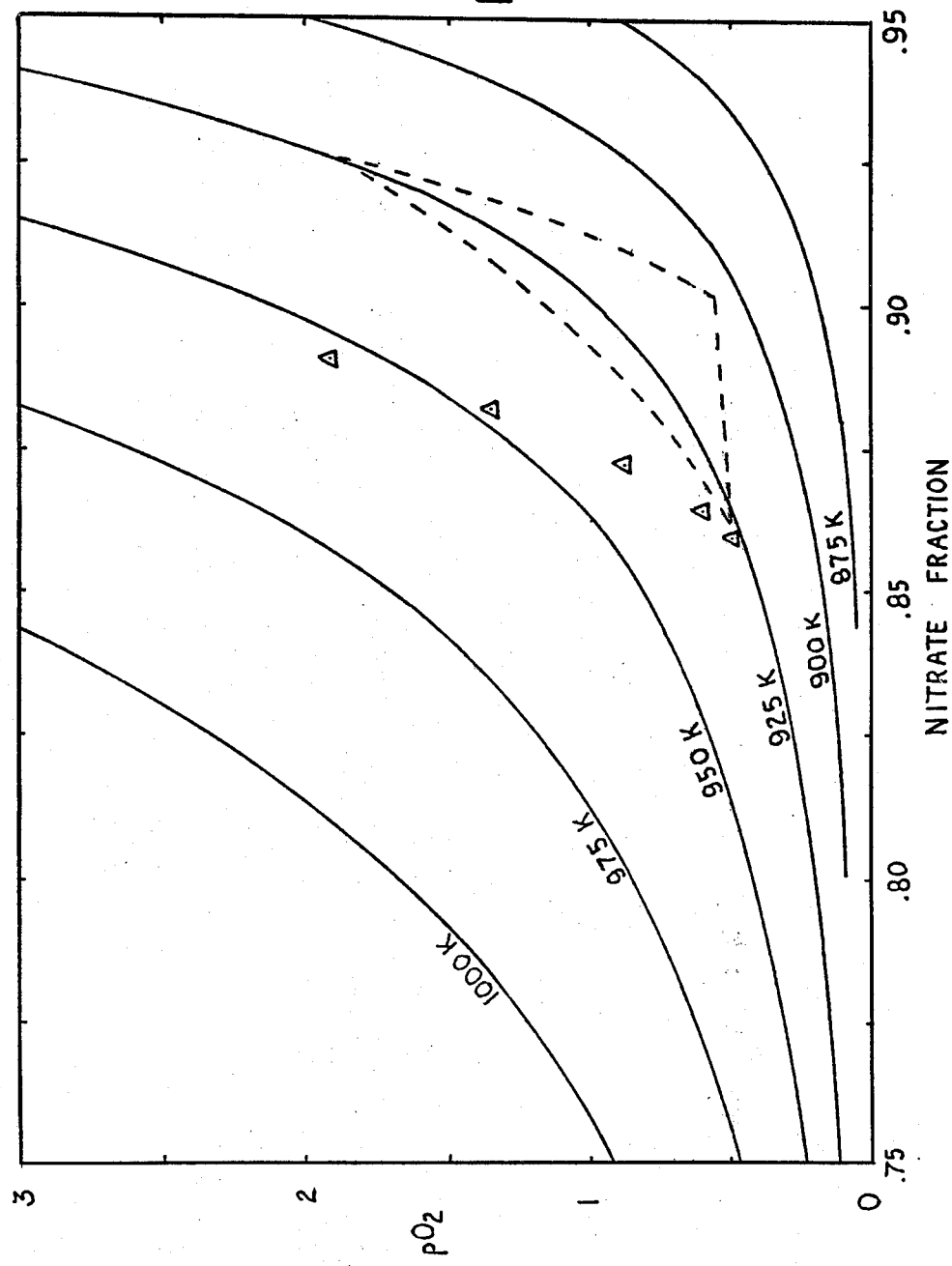
FIG. 3 illustrates the thermodynamic behavior of the oxygen acceptor, and particularly the dependence of its equilibrium pO$_2$ on salt concentration as well as on temperature.

This expression shows that the equilibrium pO$_2$ of this oxygen acceptor is not only a function of temperature, as is the case with all other oxygen acceptors, but it is also a function of the amount of oxygen reacted with the salt, i.e. of the changing activities of the nitrates and nitrites. FIG. 3 illustrates that functionality—the equilibrium pO$_2$ (in atmospheres) is seen to vary at constant temperature (degrees Kelvin) as the salt nitrate fraction varies, where the nitrate fraction signifies the ratio $$\frac{a(MNO_3)}{a(MNO_3) + a(MNO_2)}$$

FIG. 3 was derived from experimental data, and applies to cation compositions of between 30% and 70% sodium, balance potassium. Pure salt data is found in the references, and varies only slightly from the values shown in FIG. 3.

The above dependence of pO$_2$ on salt concentration is the reason a marked advantage is obtained from multistage countercurrent absorption. When pO$_2$ does not depend on the oxygen loading of the oxygen acceptor, as with most prior art acceptors, then the acceptor pO$_2$ is relatively constant throughout the absorber, and at a value which necessarily must be lower than the pO$_2$ of the exhaust oxygen depleted air. With the current salt and a countercurrent reaction however, the thermodynamic limitations are that the incoming (oxygen deficient) salt must have a pO$_2$ lower than the exhaust oxygen depleted air, and also the exiting (oxygen loaded) salt must have a pO$_2$ lower than the incoming air. Accordingly the exit salt pO$_2$ can be much greater than the exhaust air pO$_2$.

The alkali metal peroxides and superoxides also undergo an exchange of oxygen with the gas phase, thereby contributing to the net production of oxygen, as shown in reaction (2). However their presence has been found to be much more vital than the small reaction (2) contribution would indicate, for two reasons. It has been found that when only trace concentrations of superoxides and peroxides are present, all gases withdrawn from the molten salt have excessively high concentrations of nitrogen oxides, as high as several percent. However when the combined peroxide and superoxide concentration is 2% or greater, the nitrogen oxides are reduced to close to their equilibrium values, i.e. in the low ppm range. Reaction (6) shows that the salt pN$_2$ varies inversely with the oxide concentration; it is hypothesized that the lowest energy path for the salt to relieve the high nitrogen tension associated with low oxide concentration is via NO$_x$ generation, which would account for the high NO$_x$ levels in those circumstances. Secondly, a combined peroxide and superoxide concentration greater than 2% has been found to markedly improve reaction kinetics. For example pure oxygen was bubbled through a mixture of pure nitrate and nitrite salt virtually without effect. Then the bubbling was repeated at the same temperature after adding 2% peroxides plus superoxides to the melt. The oxygen reacted rapidly and almost quantitatively with the second melt. This observation suggests the hypothesis that the actual reaction mechanism which leads to the overall reaction (1) is probably primarily a combination of reactions (2) and (3). However irrespective of any hypothetical explanations, a critical minimum concentration of approximately 2% combined peroxides and superoxides has been found to yield advantageous results, and should be maintained.

The upper limit on combined peroxide and superoxide concentration is not as critical. However high concentrations will reduce the purity level of the product oxygen by producing nitrogen (e.g. reaction (6)), and also are more corrosive, hence a nominal upper limit of 25% is cited, where it is normally preferable to remain close to the lower limit.

The nitrate and nitrite concentrations provide the bulk of the oxygen carrying capability of the salt, hence it is desirable to maximize their combined concentration, i.e. to minimize the concentration of inert salt diluents or impurities. The impurities of greatest concern are carbonates and hydroxides, which will form from the $CO_2$ and $H_2O$ naturally present in air according to reactions (4) and (5). In order to limit the carbonate and hydroxide concentration to less than approximately 10% at steady state, the $CO_2$ and $H_2O$ concentrations in the supply air must be reduced to 6 ppb and 1 ppm respectively. This requirement for a high degree of purification of $CO_2$ and $H_2O$ is shared by other chemical air separation processes and also by air liquefaction processes, and standard techniques are available to achieve it: molecular sieves, BaO guard reactors, etc.

The ratio of nitrate to nitrite concentration in the salt corresponds to the equilibrium $pO_2$ values encountered at process conditions, and ranges roughly from 4 to 25. In other words, the anion composition of the salt should include from 50 to 94% nitrate and from 4 to 25% nitrite.

The cation composition of the salt is an important means by which the anion composition can be maintained within desired ranges at steady state conditions. The free energy of formation of a given salt constituent typically varies with choice of cation. Hence varying the cation mixture changes the $\Delta G_f$, i.e. the stability, of each constituent, and the concentration of each varies with its stability. The temperature range of interest for this oxygen acceptor is approximately 800 K. to 1100 K.; at the low end it is limited by reaction kinetics whereas at the high end it is limited both by corrosion and by a tendency of the salt to decompose to solid oxide.

With potassium cation, the nitrate is most stable, followed by nitrite, superoxide, peroxide, and then oxide. Hence in potassium salt the superoxide is the preponderant species of oxide, and its concentration typically ranges from 1 to 10%. With sodium the peroxide is much more stable: more so than the nitrite, and at higher temperatures even more so than the nitrate. Thus pure sodium salts typically have peroxide concentrations in the range of 15 to 75% at equilibrium, depending on process conditions. The main effect of mixing sodium and potassium cations is to reduce the peroxide concentration while leaving the relative concentrations of nitrate, nitrite, and superoxide relatively unchanged. This has several advantageous effects, including lower melting point, lower combined total of superoxide plus peroxide, which minimizes $N_2$ and corrosion, and causes the concentrations of peroxide and superoxide to be the same order of magnitude. Also the salt cost is lower than with pure potassium cations.

With lithium cations the oxide is significantly more stable than any other species. It is so stable that the liquid oxide activity reaches the point at which pure solid oxide condenses out of solution, and hence the melt slowly irreversibly decomposes to solid oxide. Fortunately with both sodium and potassium cations the liquid oxide activity is low enough to preclude this condensation. However this limits the lithium cation capacity of the salt to no more than approximately 15%.

In summary, a salt cation composition of 30 to 70% sodium, balance potassium, is preferred. However, compositions outside this range, even including some lithium, will also be found useful.

Process Disclosure (Best Mode for Carrying Out the Invention)

Figure 1:
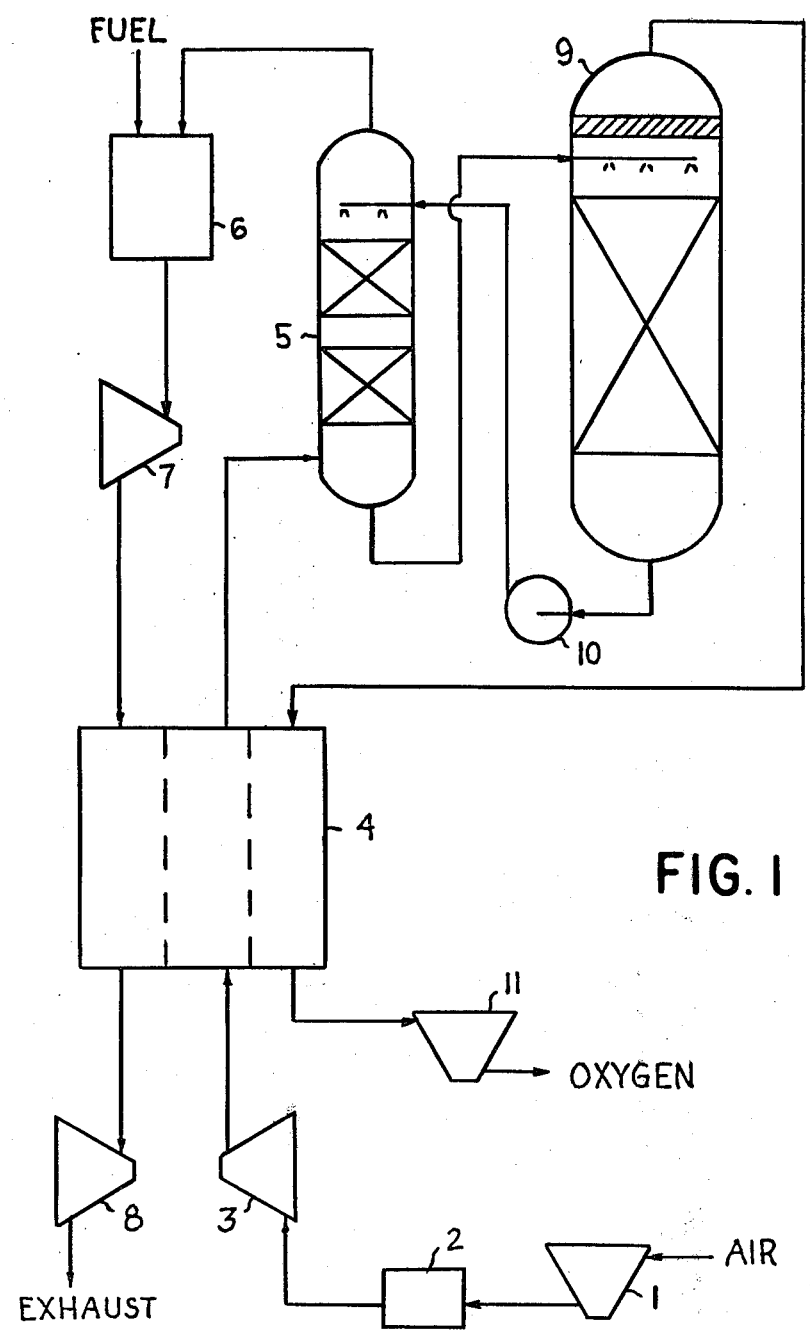
FIG. 1 is a flowsheet illustrating the sequence of major process steps which yield a high process efficiency, including conventional absorption and decomposition towers.

Referring to FIG. 1, air is compressed to an intermediate pressure in isothermal compressor 1 (i.e. a compressor incorporating means for air cooling), purified of $CO_2$ and $H_2O$ in a conventional purification apparatus 2, and then adiabatically compressed to the absorption pressure in compressor 3. This compression combination has been found to yield the most efficient overall result. Strictly isothermal compression takes less mechanical energy but requires too much additional thermal energy from the heat exchanger; conversely, strictly adiabatic compression requires much greater mechanical energy, which the thermal savings in the heat exchanger are not sufficient to offset. By combining isothermal and adiabatic compression in that order, at least a 5% net energy savings is realized in the overall process relative to using either type of compression alone, provided each compressor carries at least 25% of the total compression duty.

The pressurized purified air is heated in heat exchanger 4 and then reacted with the oxygen acceptor in absorption tower 5. This tower can be any configuration in which multistaged countercurrent contact is obtained between the salt and air, for example packed tower, bubble cap or sieve tray tower, etc. The exhaust air, substantially depleted in oxygen content, then enters a combustion chamber 6 and it is reacted with a fuel such as distillate, natural gas, or fuel gas. This raises its temperature and further depletes its free oxygen content. Then it is partially expanded in turbo-expander 7. The degree of expansion is controlled to regulate the turbine exhaust temperature, which in turn controls the temperature of the air entering the absorption tower. After the partially expanded exhaust is heat exchanged against the incoming air in heat exchanger 4, the expansion to ambient pressure is completed in turbo-expander 8. The above exhaust treatment sequence ensures that heat is added to the process at the hottest possible temperature, which improves efficiency. Also, the hottest temperature in heat exchanger 4 is substantially below maximum process temperature.

Oxygen loaded salt from absorption tower 5 is reduced in pressure and then sprayed or routed into decomposition tower 9. This tower can also be any of several conventional configurations including a packed tower or even a simple single stage pot type reactor. The decomposition reaction is slower than the absorption reaction. Also the gas volume handled in the decomposition tower is larger due to its lower pressure. Both factors contribute to the appreciably larger size of the decomposition tower relative to the absorption tower. The oxygen depleted salt withdrawn from the decomposition tower is increased in pressure and recycled to absorption tower 5 by pump 10. The product oxygen is withdrawn from the decomposition tower overhead, heat exchanged against the supply air, further cooled as appropriate, and then compressed in evacuation compressor 11.

Figure 2:
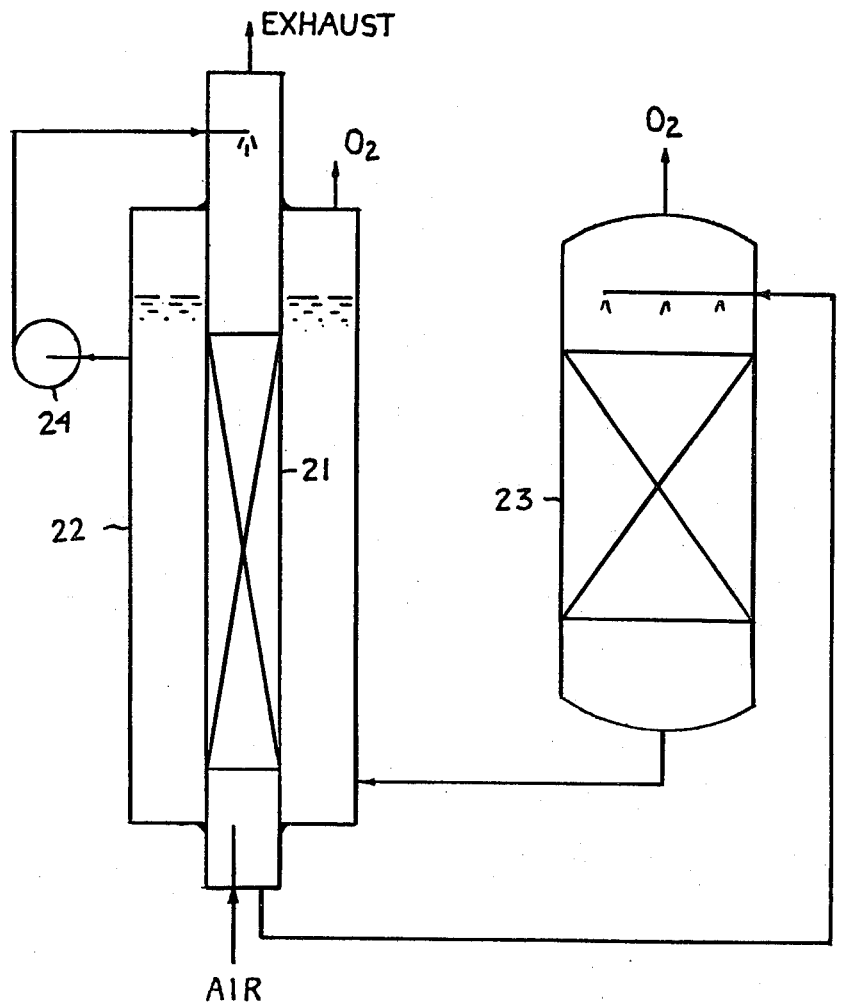
FIG. 2 illustrates an alternative configuration for the absorption and decomposition towers wherein heat exchange is advantageously effected between the respective reactions.

In the absorption and desorption apparatus just described, the endothermic heat of the decomposition reaction is supplied by the sensible heat of the salt. For each 1% of nitrate which decomposes to nitrite plus oxygen, the salt is cooled by approximately 9° C. As decomposition temperature decreases, the decomposition pressure decreases markedly. In order to avoid pressure difficulties with the decomposition reaction, its temperature should not be more than 50 K. below the absorption reaction temperature. Therefore in the above apparatus the amount of salt which can be reacted per cycle is limited to approximately 5%, which in turn requires a relatively large amount of salt pumping. It has been found that the required amount of salt pumping can be reduced, and hence the overall process efficiency can be increased, if the process is configured such that at least part of the decomposition reaction heat requirement is supplied from the exothermic heat released by the absorption reaction. That is, the absorption reaction salt and decomposition reaction salt are configured in heat exchange relationship, thereby minimizing the temperature difference between the two by the heat flow between them. An apparatus which accomplishes this result is illustrated in FIG. 2. Absorption is conducted in one or more cylinders 21 containing appropriate packing to effect efficient countercurrent contact. A sleeve 22 encloses the cylinders and serves as a container for salt undergoing the desorption reaction. Thus heat exchange is effected through the wall of cylinder 21, which may be finned or otherwise modified to improve heat transfer. Salt from the absorption reaction is depressurized and sprayed into optional decomposition tower 23, which cools it and releases some of the product oxygen. Then it is routed to sleeve 22, where it picks up heat and cools the absorption reaction, thereby releasing additional oxygen. Finally it is increased in pressure and recycled back to the absorption cylinder 21 by pump 24. The pump can advantageously be a vertical submerged pump which avoids sealing difficulties, or other known high temperature designs, including the blow case pump. The entire absorption-decomposition apparatus illustrated in FIG. 2 can advantageously be substituted for the simpler apparatus without heat exchange in FIG. 1.

Operating Conditions

The best mode for producing oxygen using the above disclosed salt composition in the above disclosed process sequence will be achieved by adhering to the following operating conditions.

The temperature of the absorption reaction should be in the range of 875–1000 K., and that of the decomposition reaction in the range of 850–975 K. Overall process efficiency is strongly enhanced by decreasing the absorption reaction pressure and by increasing the fraction of oxygen which is extracted from the incoming air. The latter parameter is limited by the amount of oxygen which must be left in the exhaust to provide the stoichiometric requirements for combustion with fuel. Combustion requires on the order of 15% of the inlet supply of oxygen, and hence the fraction of oxygen extracted should range from 0.7 to 0.9. For a given fractional $O_2$ extraction, lower absorption pressures require lower decomposition pressures. For fractional $O_2$ extraction in the above range, the absorption pressure will be between 16 and 50 times the decomposition pressure. The minimum practicable decomposition pressure is determined by size of required equipment, rate of salt loss by evaporation or entrainment, and power required for the vacuum compressor, and is on the order of 0.1 atmosphere. Normally decomposition pressures in the range of 0.1 to 3 atmospheres will be used, typically 0.4 atmosphere. This results in absorption pressures of 5 to 30 atmospheres, typically 10. The reaction temperatures and pressures strongly affect the change in oxygen loading of the salt between the two reactions, which in turn is related to the salt circulation rate. The amount of salt reacted per cycle falls in the range of 2% to 14% (molar percent), and the corresponding salt circulation rate is between 15 and 100 moles of salt circulated per mole of oxygen produced.

Example operating conditions for the flow sheet of FIG. 1 are presented in the following table. In the table, the temperature and pressure of the process stream exiting the indicated component are tabulated. Also shown are the power ratings and efficiencies of the rotating machinery. The power ratings reflect steady state production of oxygen at a rate of 300 metric tons per day. Temperatures are in degrees Kelvin, with degrees Fahrenheit indicated in parentheses. Pressures are in atmospheres, and power is in kilowatts, either mechanical or thermal as appropriate.

The first compressor 1 has sufficient cooling to approximate a 333 K. isothermal compressor, and compresses the air to 5.13 atm. The adiabatic compressor 3 further compresses the air to 11 atm., as it adiabatically heats up to 435 K. The respective power ratings are 3734 kW and 1947 kW, that is the adiabatic compressor supplies 34.3% of the total compression power. The air is then heated to 900 K. in heat exchanger 4, which has a thermal duty rating of 8874 kW. Then the air is introduced into absorption tower 5 in countercurrent contact with circulating salt. The absorption tower in the example has four theoretical plates. The $pO_2$ of the incoming air is 2.31 atm., and it exits at a total pressure of 10.7 atm and a $pO_2$ which has been reduced to 0.6 atm., at 931 K. The salt enters the absorption tower at a nitrate fraction of 0.86 and a $pO_2$ of 0.5 atm. In the successive stages, its nitrate fraction increases to 0.89 and its $pO_2$ increases in each stage to 0.86, 1.35, 1.91, and finally 2.31 atm., the exit concentration. The changing salt composition as it adiabatically traverses the absorption tower

| Component | Pressure | Temperature | Power | Efficiency |
|---|---|---|---|---|
| Compressor 1 | 5.13 | 333 (140) | 3734 | .8 |
| Compressor 3 | 11 | 435 (323) | 1947 | .8 |
| Heat exchanger supply | 10.9 | 900 (1160) | 8874 | |
| Absorption tower gas | 10.7 | 931 (1215) | | |
| Combustor | 10.5 | 1278 (1840) | 5455 | |
| Turbo-expander 7 | 3.22 | 967 (1280) | 4881 | .85 |
| Heat exchanger exhaust | 3.22 | 491 (423) | | |
| Turbo-expander 8 | 1 | | 1860 | .85 |
| Decomposition tower gas | 0.35 | 927 (1209) | | |
| Evacuation compressor | 1 | 333 (140) | 394 | .8 |
| Absorption tower salt | 10.9 | 953 (1256) | | |
| Decomposition tower salt | 0.35 | 927 (1209) | | |
| Pump | 11 | 928 (1210) | 673 | .6 | is plotted on FIG. 3, and indicated by triangles. Thus the $pO_2$ of the salt exiting the absorber, 1.91, is much greater than the 0.6 $pO_2$ of the oxygen depleted air withdrawn from the absorber, and approaches that of the incoming air. After heating the exhaust to 1278 K.

by combustion with fuel at a heating value rate of 5455 kW (677 BTU/lb $O_2$), the hot exhaust is expanded to 3.22 atm. and 967 K. This pressure and corresponding temperature provide the required air preheat temperature of 900 K. Then the residual compression energy is recovered in turbo-expander 8, another 1860 kW. The possibility will be noted of mounting compressor 3 and expander 8 on a single shaft/reduction gear complex, and similarly for compressor 1 and expander 7. A small motor generator geared to each complex could supply electric power for pump and evacuation compressor operation, and also furnish startup power. The gas pressure in the desorber is 0.35 atm., which is the supply pressure to both the pump 10 and the evacuation compressor 11. The desorber salt in decomposition tower 9 only is decreased to a $pO_2$ of 0.5 however, due to kinetic limitations, and the tradeoff against the required size of and resistance time in the decomposition reactor.

Overall, the energy required for oxygen production via the process of the above example is less than 55% of the thermal energy required to run a modern liquefaction plant having a 33% thermal to mechanical conversion efficiency. Other operating conditions within the disclosed operating ranges will be found to yield even further improvements in energy efficiency. For example, the dashed line loop on FIG. 3 reflects the salt composition locus for an absorption-decomposition cycle using the heat exchange apparatus of FIG. 2, and the same endpoint pressures as example 1. The major change is that salt loading cycles between 86% nitrate fraction and 92.5% nitrate fraction, vice between 86% and 89%. This reduces pump power by slightly more than half, and yields about a 6% further reduction in total process energy requirement.

I claim:

1. A continuous process for separating oxygen from air comprising reacting an oxygen acceptor with air in an absorption reaction, separately decomposing the oxidized oxygen acceptor to yield oxygen and regenerated oxygen acceptor, and recycling the oxygen acceptor, characterized in that the oxygen acceptor is a molten solution of alkali metal salt comprised of a cation composition of sodium and potassium cations and an anion composition of 50 to 94% nitrate, 4 to 25% nitrite, and 2 to 25% combined peroxide and superoxide.

2. The process of claim 1 wherein the absorption reaction between the molten alkali metal salt solution and air is conducted in multiple, countercurrent stages, whereby the $pO_2$ of the salt withdrawn from the absorption reaction is greater than the $pO_2$ of the oxygen depleted air withdrawn from the absorption reaction.

3. The process of claim 2 comprising the additional steps of combusting a fuel with the oxygen depleted air, thereby yielding a hot combustion gas; partially expanding the hot combustion gas to recover mechanical energy in a turbo-expander; heat exchanging the partially expanded combustion gas against the air supplied to the absorption reaction; and completing the expansion of the cooled partially expanded combustion gas to recover additional mechanical energy.

4. The process of claim 3 comprising the additional step of transferring heat from the salt undergoing the absorption reaction to the salt undergoing the decomposition reaction.

5. The process of claim 2 comprising the additional step of compressing the air to absorption reaction pressure using a cooled compressor first followed by an adiabatic compressor, wherein each compressor supplies at least 25% of the total compression power.

6. The process of claim 2 wherein the decomposition reaction is conducted in at least two sequential stages.

7. The process of claim 1, 2, 3, or 4 wherein
the absorption reaction temperature is in the range 875–1000 K.;
the absorption reaction pressure is in the range 5–30 atm;
the decomposition reaction temperature is in the range 850–975 K.;
the decomposition reaction pressure is in the range 0.1–3 atm;
the fraction of $O_2$ extracted from air is in the range 0.7–0.9 ;
the ratio of absorption pressure to decomposition pressure is in the range 16–50;
the salt molar circulation per mole of oxygen produced is 15–100 moles/mole; and
the cation composition is in the range of 30 to 70% potassium, balance sodium.

* * * * *